G. J. KINGSBURY.
Cracker-Machines.
No. 143,579.            Patented Oct. 14, 1873.
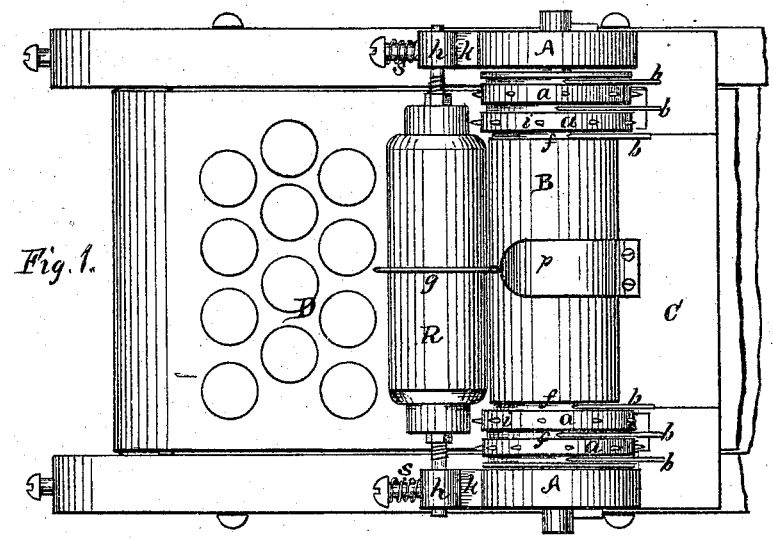
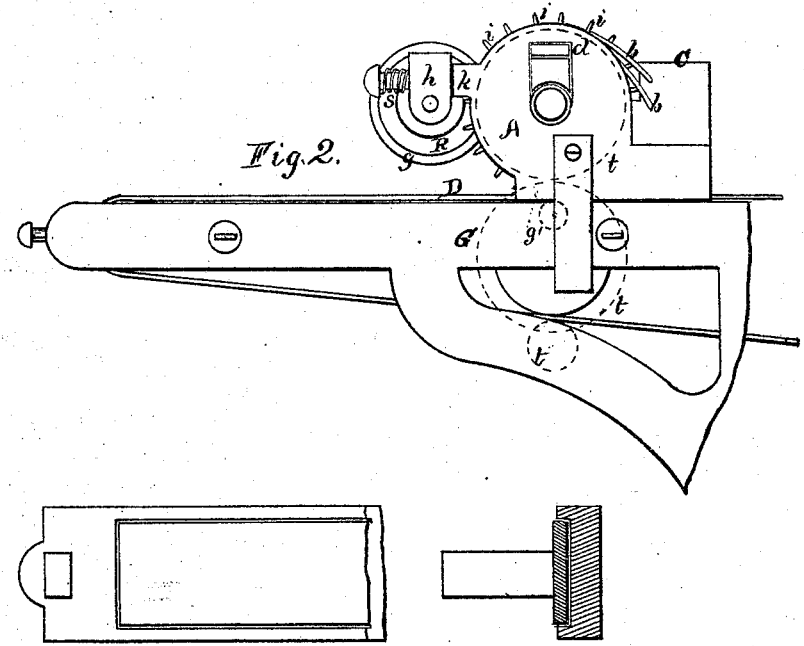
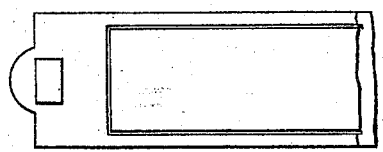
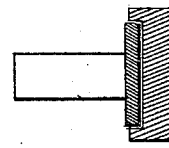

UNITED STATES PATENT OFFICE

GILBERT J. KINGSBURY, OF ROCHESTER, NEW YORK.

IMPROVEMENT IN CRACKER-MACHINES.

Specification forming part of Letters Patent No. 143,579, dated October 14, 1873; application filed April 3, 1873.

*To all whom it may concern:*

Be it known that I, GILBERT J. KINGSBURY, of Rochester, in the county of Monroe and State of New York, have invented certain Improvements in Cracker-Machines, of which the following is a specification:

This invention consists mainly in the employment of a scrap-separator of peculiar construction in cracker-machines.

Figure 1 is a top view of a portion of an ordinary cracker-machine frame and belt having my invention attached. Fig. 2 is a side elevation of the same.

A represents the heads or hangers for the support of the picker or lifting roller B, such hangers being attached to the frame of the ordinary cracker-machine. The plain portion of the roller or cylinder B should be suspended sufficiently above the belt D to clear the thickness of the crackers as they are carried under it; but each end should be provided with one or more enlargements, as shown at $a$, which have several points, $i$, that are caused to impinge sufficiently upon the belt D to secure the partial movement or rotation of the roller at every impulse or movement of the belt. $bb$ are clearer-rods, one end of which is fixed in the gathering-board C, and their other ends rest in the grooves $f$, which should be deep enough to permit the point of the clearers to lie below the face or periphery of the cylinder. The roller B may have cushioned bearings, as shown at $d$, Fig. 2, which is an elastic presser to keep the points $i$ pressed down firmly upon the belt D. R is an auxiliary roller hung in sliding boxes $h$ on the projections $k$. This roller is provided centrally with an annular cutter, $g$, used to divide the scraps. The roller B may be driven by a pawl and ratchet, if desired, from the main driving-shaft of the machine, or by other suitable means. $p$ is a plate fixed to the gathering-board or trough C, and acts to separate the scraps from the face of the roller, and to part or divide them centrally.

When it is desirable to discharge the scraps from one side, or collect them in quantities in a trough or receptacle at C, the roller R and cutter $g$ may be dispensed with.

The operation is as follows: The rolled dough is of sufficient width to leave a marginal strip on each side beyond the reach of the cutters of three-fourths of an inch wide, more or less. There is also a shred of dough left around each cracker to connect the cuttings, indicated at $x$, between the circles shown on the left in Fig. 1. Upon each forward movement of the belt D the pickers $i$ pierce the marginal band of dough on each side, and roll so much of it up, together with all the intervening scraps of dough, as is measured by one stroke of the cutter, and the annular cutter $g$ divides the dough-scraps and allows them to be discharged on each side of the machine.

What I claim as my invention, is—

1. In combination with the picker roller B, a scrap cutter or divider $g$, for the purposes set forth.

2. In combination with the pins $i$ and roller B, the clearers $b$, constructed and arranged to operate in the manner and for the purposes set forth.

3. The picker teeth or pins $i$ and roller B in cracker-machines, in combination with the dough-belt D, for the purposes set forth.

4. The combination, in cracker-machines, of the dough-belt D and primary roller B, with its picker-pins $i$, with the scrap or gathering board C, and clearers $b$, all acting conjointly as and for the purposes set forth.

G. J. KINGSBURY.

Witnesses:
WM. S. LOUGHBOROUGH,
DANIEL WOOD.